(12) United States Patent  
Schmidt

(10) Patent No.: US 9,397,719 B1
(45) Date of Patent: Jul. 19, 2016

(54) MOBILE DEVICE HOLDER

(71) Applicant: AIRO COLLECTIVE, INC., Elk Grove, CA (US)

(72) Inventor: Steve Schmidt, Elk Grove, CA (US)

(73) Assignee: AIRO COLLECTIVE, INC., Elk Grove, CA (US)

( * ) Notice: Subject to any disclaimer, the term of this patent is extended or adjusted under 35 U.S.C. 154(b) by 0 days.

(21) Appl. No.: 14/741,960

(22) Filed: Jun. 17, 2015

(51) Int. Cl.
| H04M 1/02 | (2006.01) |
| H04B 1/3877 | (2015.01) |
| F16B 1/00 | (2006.01) |
| F16M 13/02 | (2006.01) |
| F16M 11/22 | (2006.01) |
| F16M 11/24 | (2006.01) |
| B60R 11/02 | (2006.01) |
| A45F 5/00 | (2006.01) |
| A45F 5/02 | (2006.01) |
| A45F 5/10 | (2006.01) |
| B60R 11/00 | (2006.01) |

(52) U.S. Cl.
CPC ............... *H04B 1/3877* (2013.01); *A45F 5/00* (2013.01); *A45F 5/021* (2013.01); *A45F 5/10* (2013.01); *B60R 11/02* (2013.01); *F16B 1/00* (2013.01); *F16M 11/22* (2013.01); *F16M 11/24* (2013.01); *F16M 11/242* (2013.01); *F16M 13/02* (2013.01); *A45F 2005/008* (2013.01); *A45F 2005/1006* (2013.01); *B60R 2011/007* (2013.01); *B60R 2011/0008* (2013.01); *B60R 2011/0035* (2013.01); *F16B 2001/0035* (2013.01)

(58) Field of Classification Search
CPC ........ H04W 88/02; H04W 88/04; H04B 1/04; H04B 1/3888; H04B 1/3877; F16M 13/02; F16M 11/041; A45F 5/00; A45F 5/02; F16B 1/00; F16B 11/22; F16B 11/24
See application file for complete search history.

(56) References Cited

U.S. PATENT DOCUMENTS

| 2002/0139822 A1* | 10/2002 | Infanti | ..................... A45F 5/00 224/197 |
| 2014/0265765 A1* | 9/2014 | Khodapanah | .......... F16M 13/02 312/223.1 |
| 2014/0355200 A1* | 12/2014 | Thiers | ................... H04W 88/02 361/679.41 |

* cited by examiner

Primary Examiner — Thanh Le
(74) Attorney, Agent, or Firm — Innovation Capital Law Group, LLP; Vic Lin

(57) ABSTRACT

A two-piece mobile device holder having a case assembly and a mounting assembly is disclosed. The case assembly is configured to receive and secure a mobile device such as a smart phone. The mounting assembly is configured to be detachably coupled to other objects. Sets of permanent magnets are arranged in a circular pattern in the case assembly and the mounting assembly. The magnets in both the first and second set of magnets are arranged with alternating magnetic polarity. As the case assembly is placed on top of the mounting assembly, the magnets in the mounting assembly will attract magnets with opposite polarities in the case assembly. A user may detach the case assembly from the mounting assembly by rotating the case assembly such that the magnets in the case assembly are now adjacent to magnets in the mounting assembly of the same polarity.

31 Claims, 21 Drawing Sheets

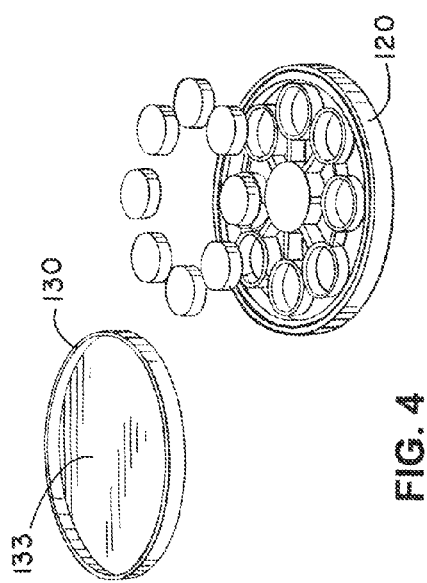
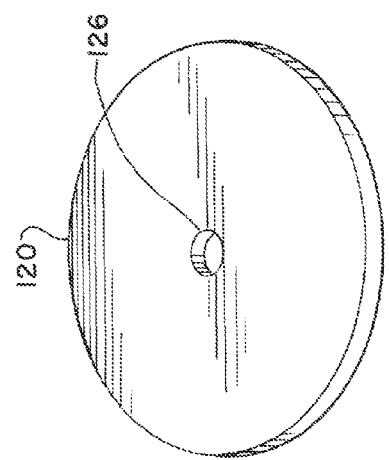
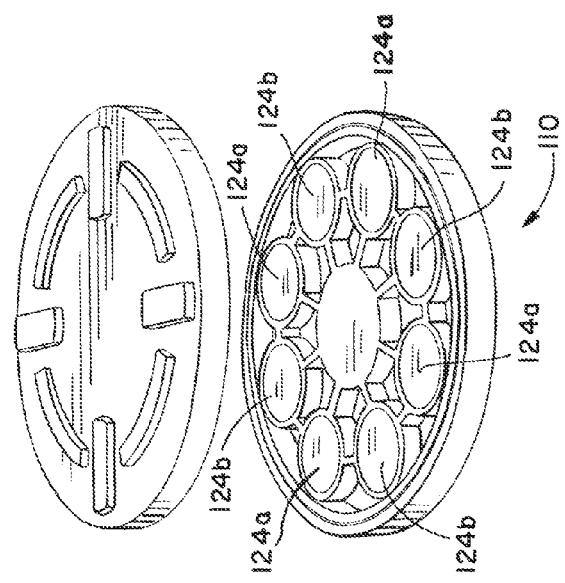

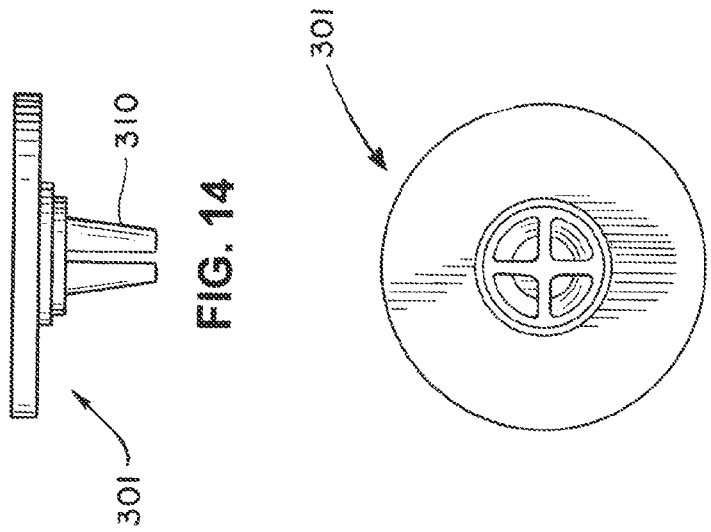
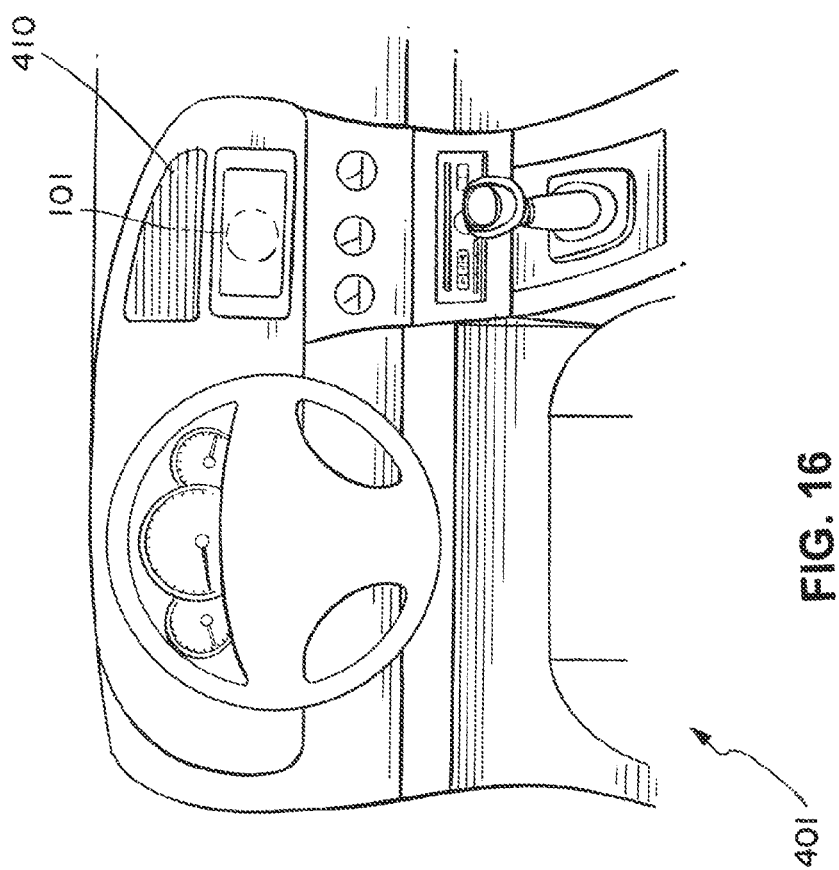

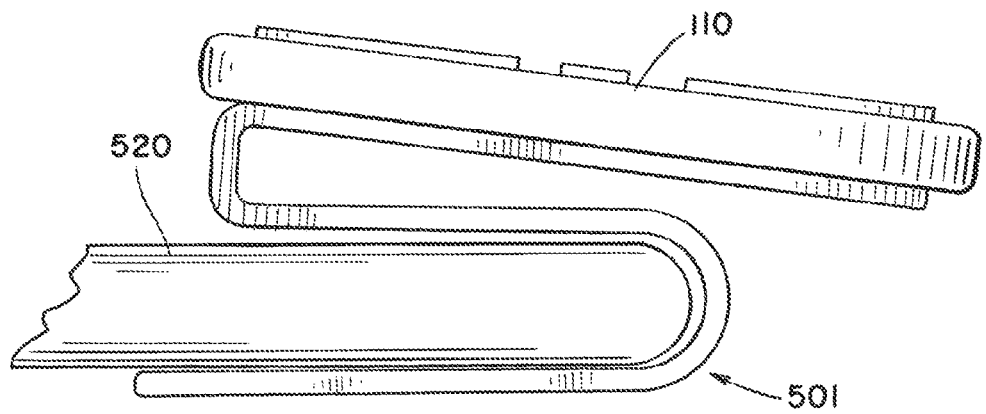
FIG. 19
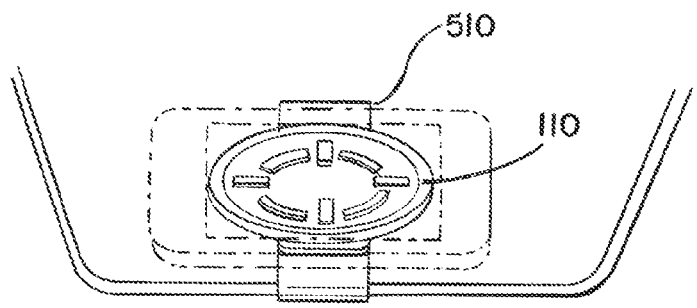
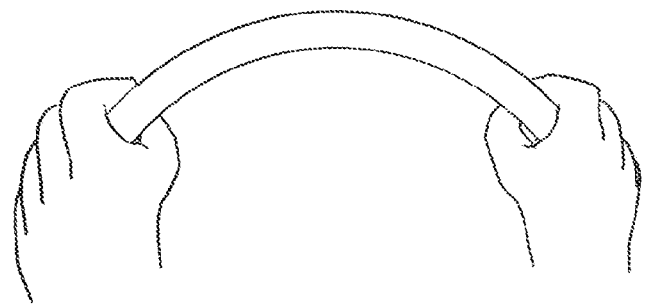
FIG. 20

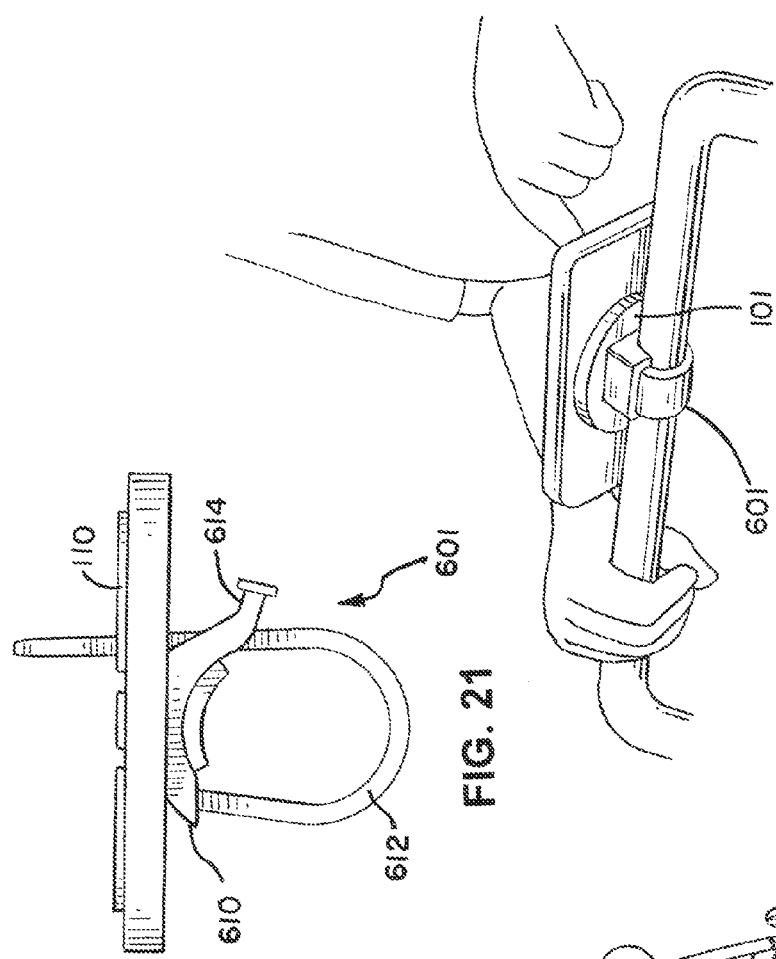
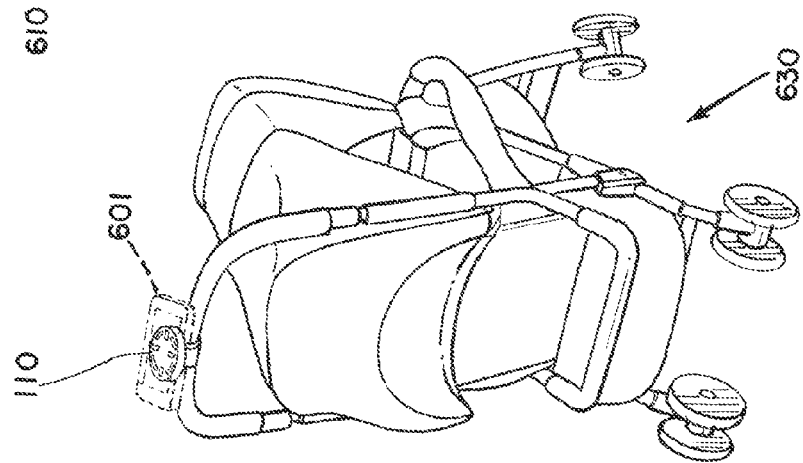

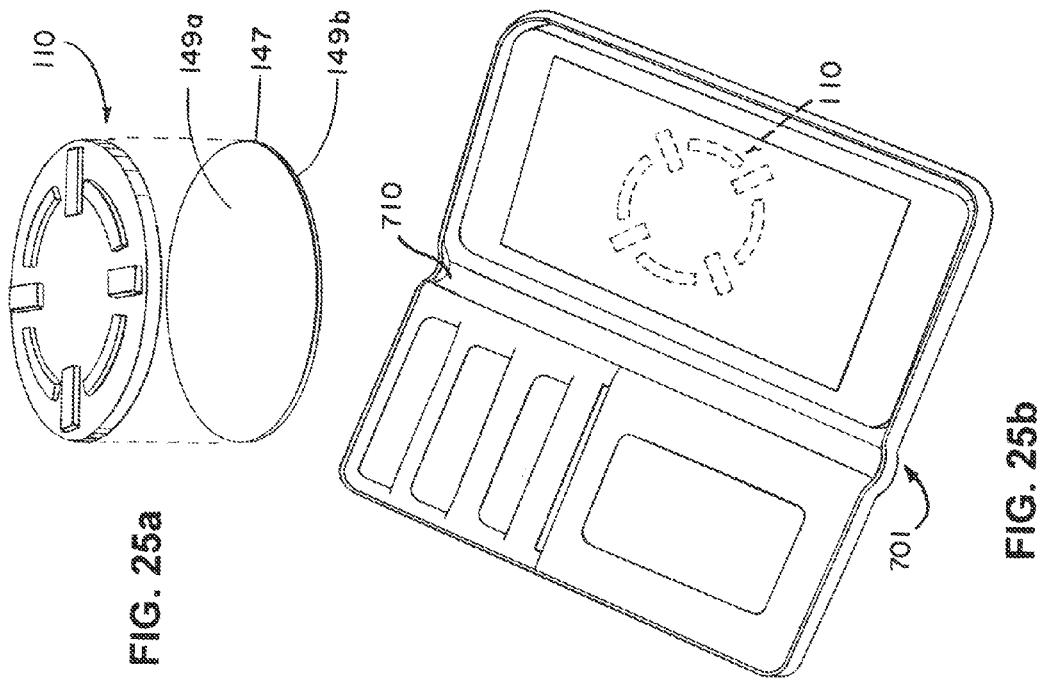
FIG. 25a
FIG. 25b
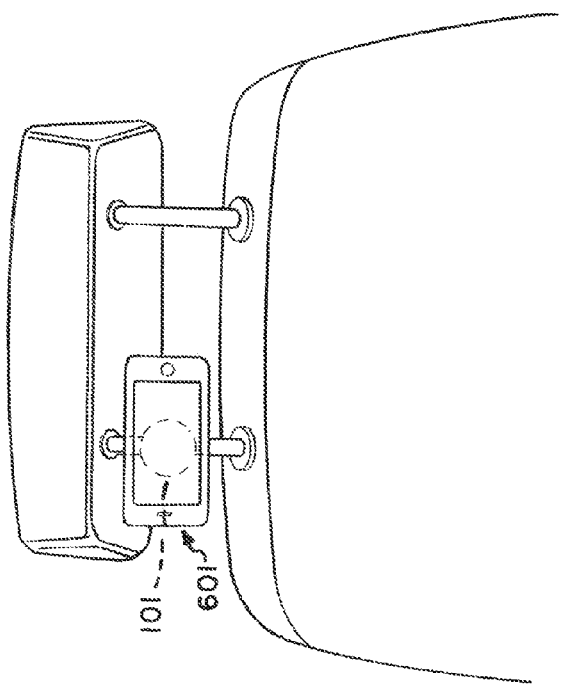
FIG. 24

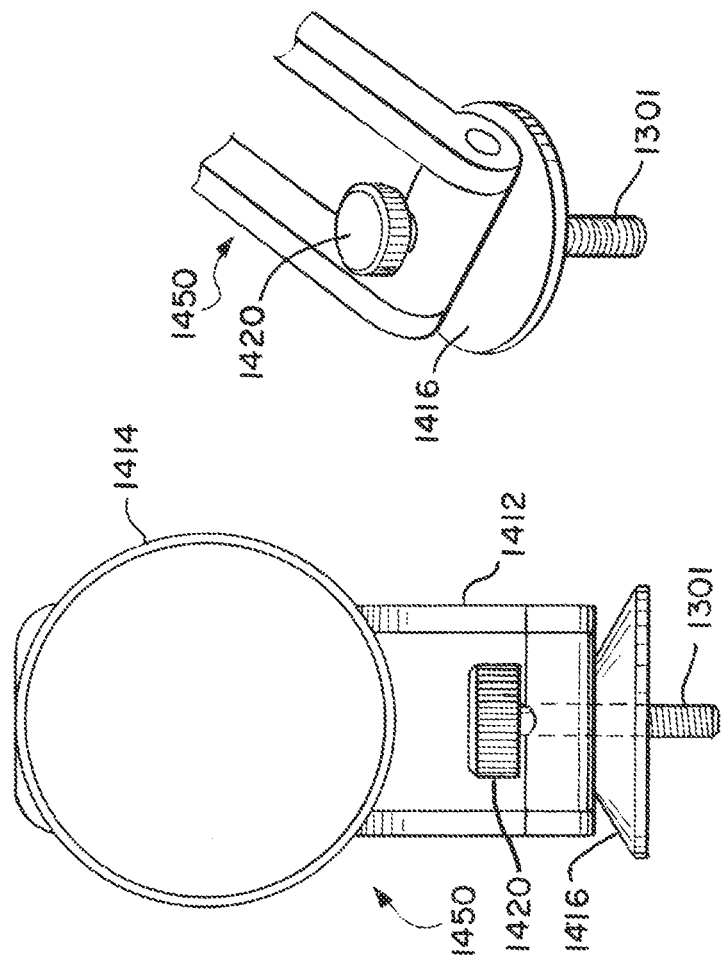
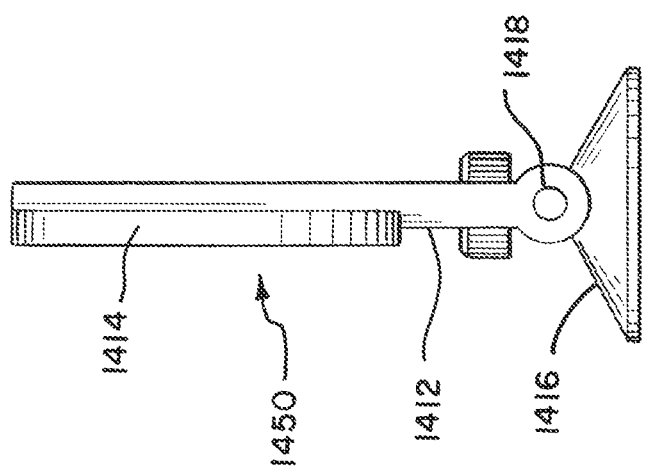
FIG. 34
FIG. 35
FIG. 36

MOBILE DEVICE HOLDER

BACKGROUND OF THE INVENTION

1. Field of the Invention

The present invention relates in general to mobile device holders for mobile electronic devices. More particularly, the invention is directed to mobile device holders employing magnets as the coupling mechanism.

2. Description of the Related Art

Many consumers rely on mobile electronic devices for telephony, Internet access, audio, video, navigation, and entertainment. While the devices are readily carried in pockets or purses, there are many activities in which consumers prefer to mount the mobile electronic devices to other objects. However, conventional mobile device holders may not provide consumers with ready and secure access to their mobile devices. More specifically, existing magnetic mounting systems do not allow for positive location of the device to the mount. They also do not provide for secure attachment to withstand movement or slipping due to vibratory forces or due to more extreme sporting activities.

Accordingly, a need exists to improve the mounting assemblies for mobile devices.

SUMMARY OF THE INVENTION

In the first aspect, a mobile device holder is disclosed. The mobile device holder comprises a case assembly comprising a case defining a cavity, the cavity having a generally flat inner surface and an outer surface opposite the inner surface, the cavity configured to receive a mobile electronic device, and a plurality of case magnets placed on the generally flat inner surface, each of the case magnets spaced apart equally circumferentially and spaced apart radially by a fixed radius from a first center. The mobile device holder further comprises a mounting assembly comprising a generally flat mounting base, a plurality of base magnets placed on the generally flat mounting base, each of the base magnets spaced apart equally circumferentially and spaced apart radially by the fixed radius from a second center, and a mount cap positioned above and coupled to the mounting base, the mount cap surrounding the base magnets. The case assembly magnetically couples to the mounting assembly when the outer surface of the case is placed on the mount cap.

In a first preferred embodiment, the case magnets are arranged with alternating polarity orientation where each of the case magnets has a different magnetic polarity orientation from that of the immediately adjacent case magnets. The base magnets are preferably arranged with alternating polarity orientation such that each of the base magnets has a different magnetic polarity orientation from that of the immediately adjacent base magnets. The case assembly magnetically preferably couples to the mounting assembly when the first center is aligned with the second center and each case magnet is magnetically coupled to a corresponding base magnet. The outer surface of the case preferably further comprises a plurality of first registration members. The mount cap preferably further comprises a top surface, the top surface further comprises a plurality of second registration members. The first registration members of the case preferably engages with the second registration members of the base during the coupling process.

The first registration members preferably comprise a plurality of rectangular shaped registration recesses positioned radially away from the first center. The second registration members preferably comprise a plurality of rectangular shaped registration protrusions positioned radially away from the second center. The first registration recesses preferably receives the first registration protrusions during the coupling process. Each case magnet is preferably positioned angularly equidistant from the immediately adjacent case magnet, and each base magnet is preferably positioned angularly equidistant from the immediately adjacent base magnet. The case assembly preferably rotates about the mounting assembly and detachably couples with the mounting assembly at one or more fixed angles. The mobile device holder preferably further comprises a fixed or foldable hinged stand coupled to the mounting assembly. The mobile device holder preferably further comprises an automobile vent mount device coupled to the mounting assembly. The mobile device holder preferably further comprises an automobile visor clip coupled to the mounting assembly. The mobile device holder preferably further comprises a mount coupled to the mounting assembly, the mount having one or more straps which are configured to detachably couple to another object. The defined flat mounting base preferably can be fixedly secured to a flat surface via mechanical fastener, adhesives, or elastomeric attachment. The defined flat mounting base preferably can be worn by the user by means of a harness, headband, arm band, belt clip, etc. The defined flat mounting base preferably can be detachably secured to or integrated with a handheld pole, where the described base is pivotally attached to a fixed or extendable pole. The defined flat mounting base preferably can be detachably secured to or integrated with a threaded tri-pod mount. The defined flat mounting base preferably can be fixedly Integrated into a wallet, by various means of attachment.

In a second aspect, a mobile device holder is disclosed. The mobile device holder comprises a case assembly configured to receive a mobile electronic device, a plurality of case magnets coupled to the case assembly, each of the case magnets spaced apart equally circumferentially and spaced apart radially by a fixed radius from a first center, a generally flat mounting base, and a plurality of base magnets coupled to the generally flat mounting base, each of the base magnets spaced apart equally circumferentially and spaced apart radially by the fixed radius from a second center. The case assembly magnetically couples to the mounting assembly when the outer surface of the case assembly is placed on the mounting base.

In a second preferred embodiment, the case magnets are arranged with alternating polarity orientation where each of the case magnets has a different magnetic polarity orientation from that of the immediately adjacent case magnets. The base magnets are preferably arranged with alternating polarity orientation such that each of the base magnets has a different magnetic polarity orientation from that of the immediately adjacent base magnets. The case assembly magnetically preferably couples to the mounting assembly when the first center is aligned with the second center and each case magnet is magnetically coupled to a corresponding base magnet. The outer surface of the case further preferably comprises a plurality of first registration members. The mount cap preferably further comprises a top surface, the top surface further comprises a plurality of second registration members. The first registration members of the case preferably engages with the second registration members of the base during the coupling process.

The first registration members preferably comprise a plurality of first rectangular shaped registration recesses positioned radially away from the first center. The second registration members preferably comprise a plurality of first rectangular shaped registration protrusions positioned radially away from the second center. The first registration recesses preferably receives the first registration protrusions during the coupling process. Each case magnet is preferably positioned angularly equidistant from the immediately adjacent case magnet. Each base magnet is preferably positioned angularly equidistant from the immediately adjacent base magnet. The described mounting base preferably can be detachably or fixedly attached to another stationary or mobile mounting surface by means of mechanical fastener, elastomeric attachment, adhesive attachment, or integrated attachment feature.

In a third aspect, a mobile device holder is disclosed. The mobile device holder comprises a case assembly comprising a case defining a cavity, the cavity having a generally flat inner surface and an outer surface opposite the inner surface, the cavity configured to receive a mobile electronic device, the generally flat surface having eight case recesses spaced apart equally circumferentially and spaced apart radially by a fixed radius from a first center the outer surface of the case further comprises a plurality of first registration members, and eight case magnets, each case magnet positioned within the corresponding case recess, the case magnets arranged with alternating polarity orientation where each of the case magnets has a different magnetic polarity orientation from that of the immediately adjacent case magnets. The mobile device holder further comprises a mounting assembly comprising a generally flat mounting base having eight base protrusions radially spaced apart by a fixed radius from a first center, each of the base magnets spaced apart equally circumferentially and spaced apart radially by the fixed radius from a second center, and a mount cap positioned above and coupled to the mounting base, the mount cap surrounding the base magnets, the top base surface of the mount cap further comprises a plurality of second registration members. The case assembly magnetically couples to the mounting assembly when the outer surface of the case is placed on the mount cap, wherein the first registration members of the case engages with the second registration members of the base top cap during the coupling process.

In a third preferred embodiment, the mobile device holder further comprises eight base magnets, each base magnet positioned within the corresponding base recess, the base magnets arranged with alternating polarity orientation such that each of the base magnets has a different magnetic polarity orientation from that of the immediately adjacent base magnets. The mobile device holder further comprises a fixed or foldable hinged stand coupled to the mounting assembly. The mobile device holder further comprises an automobile vent mount device coupled to the mounting assembly. The mobile device holder further comprises an automobile visor clip coupled to the base assembly. The mobile device holder further comprises a mount coupled to the mounting assembly, the mount having one or more straps which are configured to detachably couple to another object.

In a fourth aspect, a mobile device holder is disclosed. The mobile device holder comprises a case assembly configured to receive a mobile electronic device, a case magnet coupled to the case assembly, a generally flat mounting base, and a base magnet coupled to the generally flat mounting base. The case assembly magnetically couples to the mounting assembly when the outer surface of the case assembly is placed on the mounting base. The outer surface of the case further comprises a singular first registration member or a plurality of first registration members. The mount cap further comprises a top surface, the top surface further comprises a second registration member or a plurality of second registration members. The first registration member or members of the case engages with the second registration member or members of the base during the coupling process.

In a fourth preferred embodiment, the first registration member or members include a rectangular shaped registration recess, the second registration member or members include a rectangular shaped registration protrusion, and the first registration recess or recesses receives the second registration protrusion or protrusions during the coupling process. The described mounting base, as a separate component, preferably can be detachably or fixedly attached to another stationary or mobile mounting surface by means of mechanical fastener, elastomeric attachment, adhesive attachment, or integrated attachment feature. The defined flat mounting base as a separate component preferably can be fixedly secured to a flat surface via mechanical fastener, adhesives, or elastomeric attachment. The defined flat mounting base as a separate component preferably can be worn by the user by means of a harness, headband, arm band, belt clip, etc. The defined flat mounting base as a separate component preferably can be detachably secured to or integrated with a handheld pole, where the described base is pivotally attached to a fixed or extendable pole. The defined flat mounting base as a separate component preferably can be detachably secured to or integrated with a threaded tri-pod mount. The defined flat mounting base as a separate component preferably can be fixedly Integrated into a wallet, by various means of attachment.

These and other features and advantages of the invention will become more apparent with a description of preferred embodiments in reference to the associated drawings.

DESCRIPTION OF THE DRAWINGS

FIG. 3 is a side, partially-assembled view of the mounting assembly.

FIG. 4 is a top, exploded view of the mounting assembly.

FIG. 5 is a view of the underside of the mounting assembly showing a mounting hole.

FIG. 14 is a side view of a vent mount for affixing to an automobile vent louver.

FIG. 15 is a top view of the vent mount.

FIG. 16 is a front, perspective view showing the mobile device holder attached to the automobile vent.

FIG. 19 is a side view of a mounting assembly affixed to an automobile visor.

FIG. 20 is a front view illustrating a mobile device affixed to an automobile visor from the perspective of a driver.

FIG. 21 is a side view of a mounting assembly affixed to a universal mount.

FIG. 22 is a side, perspective view of a mobile device affixed to a baby stroller.

FIG. 23 is a view of a user interacting with a mobile device affixed to the stroller.

FIG. 24 is a front, perspective view of a mobile device affixed to a post of a headrest.

FIG. 25a is a side, perspective view of a mount assembly attaching to an adhesive backing.

FIG. 25b is a top, perspective view of a mounting assembly in a wallet.

FIG. 34 is a front view of the hinged assembly configured to mount to the chest harness.

FIG. 35 is a side view of the hinged assembly.

FIG. 36 is a side, perspective view of the hinged assembly.

DETAILED DESCRIPTION OF THE PREFERRED EMBODIMENTS

The following preferred embodiments are directed to mobile device holders for affixing mobile devices to other objects. Mobile devices provide users with real-time access to telephony, Internet, text messaging, GPS navigation, audio, and video, for example. Many activities require a convenient means for attaching and detaching mobile devices to and from other objects.

In one or more embodiments, a two-piece mobile device holder having a case assembly and a mounting assembly is contemplated. The case assembly is configured to receive and secure a mobile device, such as a smart phone. The mounting assembly is configured to be detachably coupled to other objects, such as to mounts to automobile visors or automobile air conditioning vents. A first set of permanent magnets is arranged in a circular pattern in the case assembly; and a second set of permanent magnets is arranged in a circular pattern in the mounting assembly. In one or more embodiments, the magnets in both the first and second set of magnets are arranged with alternating magnetic polarity around the circular pattern forming a ring of magnets. In other words, the magnetic polarity varies as a "North Pole-South Pole-North Pole-South Pole-..." pattern for the sets of magnets in the case assembly and the mounting assembly. As the case assembly is placed on top of the mounting assembly, the magnets in the mounting assembly will attract magnets with opposite polarities in the case assembly. Hence, the case assembly is secured to the mounting assembly by the magnetic attraction force between the two sets of magnets. A user may detach the case assembly from the mounting assembly by rotating the case assembly such that the magnets in the case assembly are now adjacent to magnets in the mounting assembly of the same polarity.

As used herein and as is commonly known in the art, a magnet may refer to permanent magnets which create persistent magnetic fields. Magnets may be characterized as having a north pole and a south pole on opposite ends of the magnet. An end of a first magnet having a magnetic polarity (e.g., north pole for example) will repel a second magnet having an end in proximity of the same magnetic polarity (e.g., north pole in this example) and will attract a second magnet having an end of opposite polarity (e.g., south pole in this example). A magnetic polarity orientation refers to the direction or vector from the south pole to the north pole within a magnet.

Figure 1:
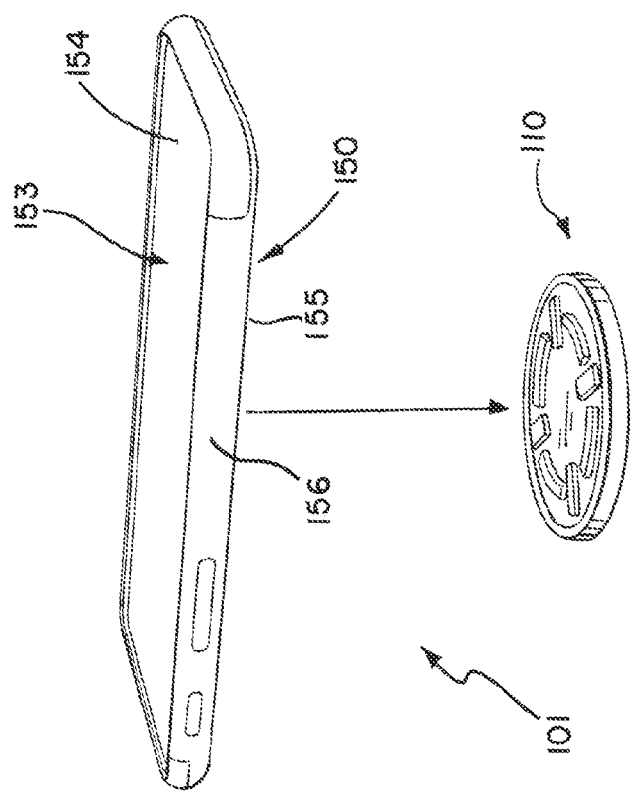
FIG. 1 is a side, perspective view of a mobile device holder comprising a case assembly and a mounting assembly.

FIG. 1 is a side, perspective view of a mobile device holder 101 i.e., a flat mounting base) comprising a case assembly 150 and a mounting assembly 110. The case assembly 150 has a cavity 153 having a generally flat inner surface 154 and an outer surface 155 opposite the inner surface 154. The cavity 153 is configured to receive a mobile electronic device such as a smartphone. In one or more embodiments, the case assembly 150 has one or more side walls 156 which may secure the smart phone in place.

Figure 2:
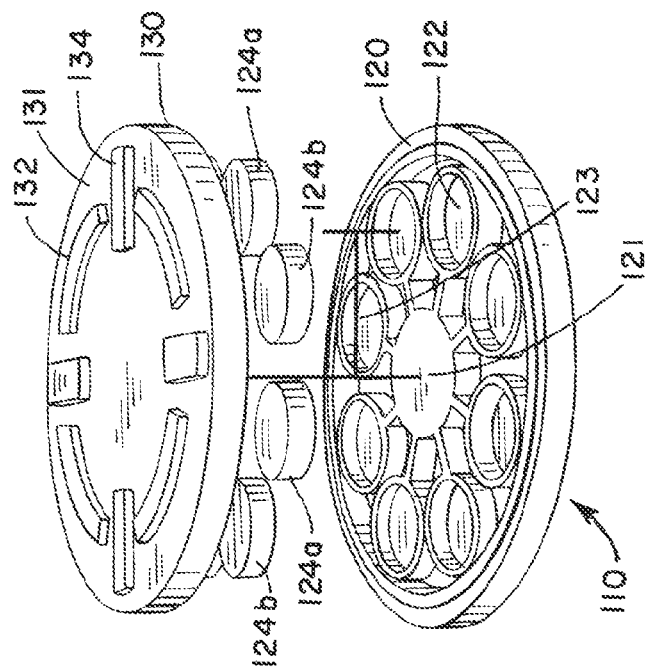
FIG. 2 is a side, exploded view of the mounting assembly.

FIG. 2 is a side, exploded view of the mounting assembly 110. The mounting assembly comprises a generally flat mount base 120 and a mount cap 130. The mount base 120 has a plurality of base recesses 122 for receiving a plurality of base magnets 124a and 124b. The generally flat mounting base 120 has a plurality of base recesses spaced apart equally circumferentially and spaced apart radially by the fixed radius 123 from a center 121. In one or more embodiments, the mounting assembly has eight base recesses. The outer surface 131 of the mount cap 130 has a plurality of protrusions 134 and 132 for registering with the case assembly when the case assembly is coupled to the mount base. The protrusions 132 run along the perimeter of the mount cap 130. Protrusions 134 extend radially away from the center of the mount cap 130.

FIG. 3 is a side, partially assembled view of the mounting assembly 110. The base recesses 122 each receive and secure base magnets 124a and 124b. Base magnets 124a and 124b may be permanent magnets where the top, exposed surfaces of base magnets 124a have the same magnetic pole, and the top, exposed surfaces of base magnets 124b all have the magnetic pole opposite to that of the base magnets 124a. In one or more embodiments, the top, exposed surfaces of base magnets 124a are all "north" and the top, exposed surfaces of base magnets are all "south." In one or more embodiments, the top, exposed surfaces of base magnets 124a are all "south" and the top, exposed surfaces of base magnets are all "north."

The base magnets 124a and 124b are placed along the perimeter of the mount base 120 and are arranged with alternating polarity orientation, such that each of the base magnets 124a and 124b has a different magnetic polarity orientation from that of the immediately adjacent base magnets 124b and 124a. This forms an alternating sequence of 124a-124b-124a-124b-124a-124b-124a-124b. As the polarity of the top surfaces of base magnets 124a are opposite that of base magnets 124b, the base magnets 124a and 124b form an alternating sequence of top surface polarities as N-S-N-S and so forth.

FIG. 4 is a top, exploded view of the mounting assembly 110 showing the inner surface 133 of the mount cap 130. FIG. 5 is a view of the underside of the mount base 120 showing a mounting hole 126. As discussed below, the mounting hole 126 is employed to physically attach the mount base 120 to other objects. In one or more embodiments, the hole 126 is a threaded hole for accepting screws or nuts.

Figure 6:
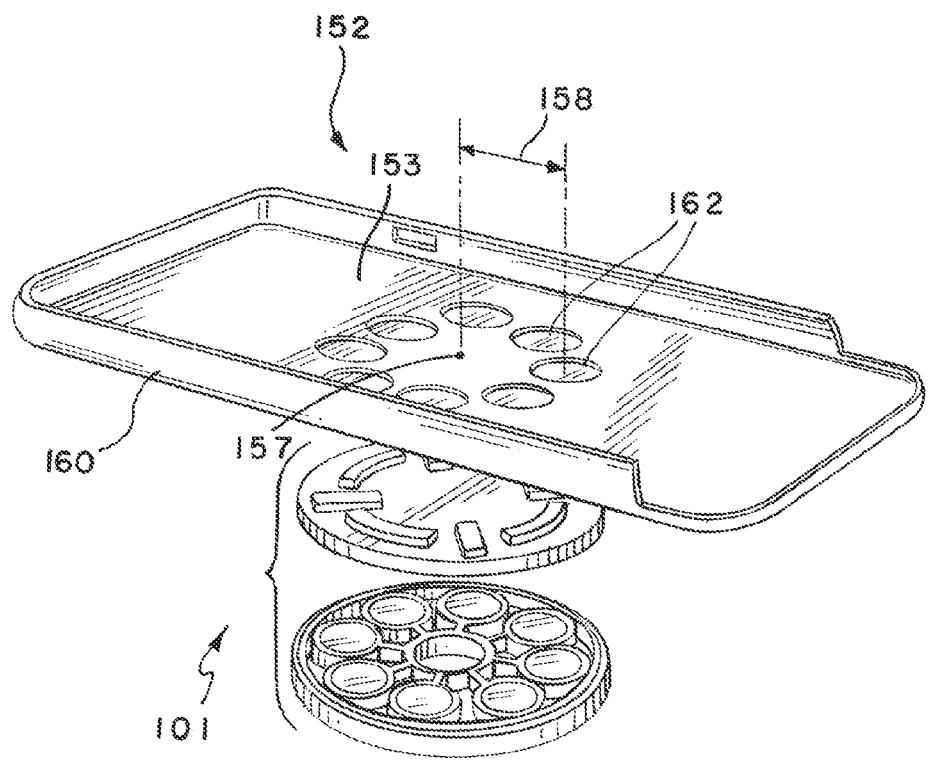
FIG. 6 is a top, perspective view of the mobile device holder.
Figure 7:
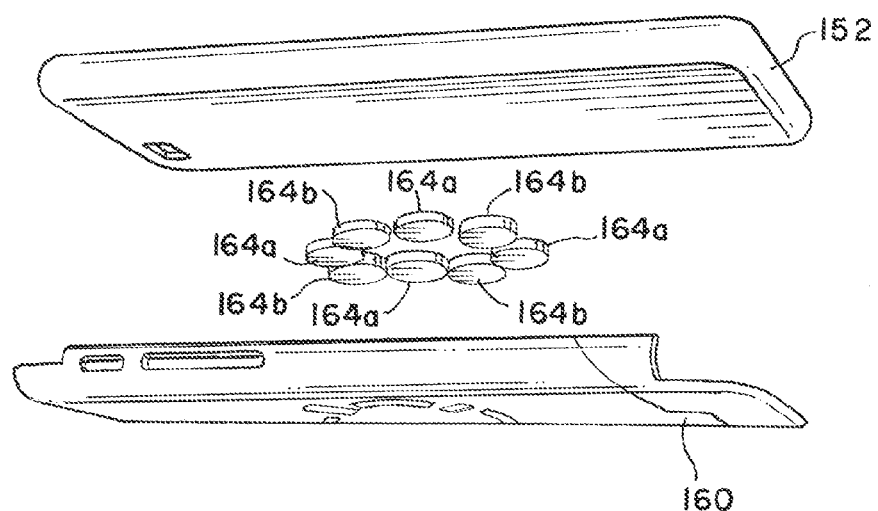
FIG. 7 is an exploded view of the case assembly.
Figure 9:
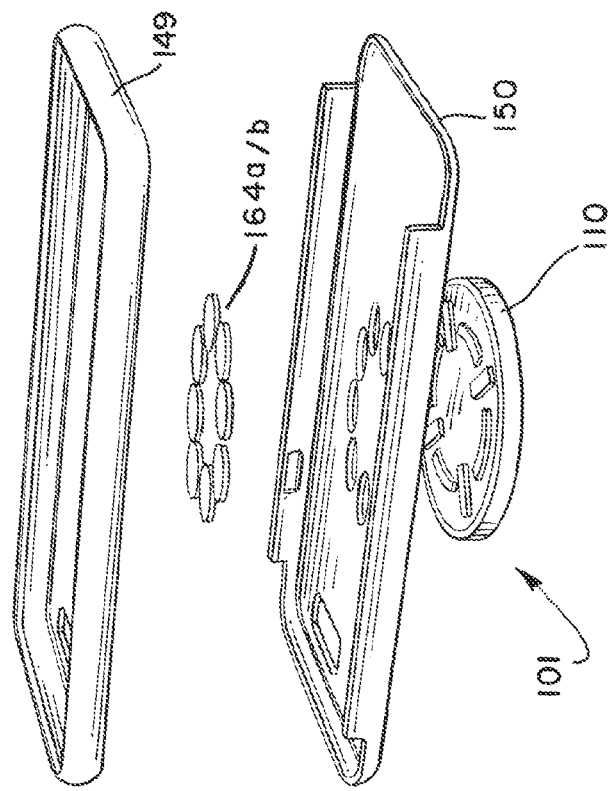
FIG. 9 is an exploded view of the mobile device holder.

FIGS. 6-9 provide details of the case assembly 150. FIG. 6 is a top, perspective view of the mobile device holder 101. The case assembly 150 has a case 160 defining a cavity 152, the cavity 152 having a generally flat inner surface 153 and an outer surface 155 opposite the inner surface 153. In one or more embodiments, a plurality of recesses 162 are formed on the flat inner surface 153 and are shaped to receive a plurality of case magnets 164a and 164b as shown in FIG. 7. Each of the case recesses 162 are spaced apart equally circumferentially and spaced apart radially by a fixed radius 158 from a center 157. In one or more embodiments, the flat inner surface 153 has eight case recesses. In one or more embodiments radius 158 is equal to radius 123.

The case recesses 162 each receive and secure base magnets 164a and 164b. Base magnets 164a and 164b may be permanent magnets where the bottom surfaces (i.e., the end surface in contact with the inner surface 153) of case magnets 164a all have the same magnetic pole, and the bottom surfaces of case magnets 164b all have the magnetic pole opposite to that of the case magnets 164a. In one or more embodiments, the bottom surfaces of case magnets 164a are all "north" and the bottom surfaces of case magnets are all "south." In one or more embodiments, the bottom surfaces of case magnets 164a are all "south" and the bottom surfaces of case magnets are all "north."

The case magnets 164a and 164b are placed along the perimeter of a larger circle and are arranged with alternating polarity orientation such that each of the case magnets 164a and 164b has a different magnetic polarity orientation from that of the immediately adjacent case magnets 164b and 164a. This forms an alternating sequence of 164a-164b-164a-164b-164a-164b-164a-164b. As the polarity of the bottom surfaces of case magnets 164a are opposite that of case magnets 164b, the case magnets 164a and 164b form an alternating sequence of bottom surface polarities as N-S-N-S, and so forth.

Figure 8:
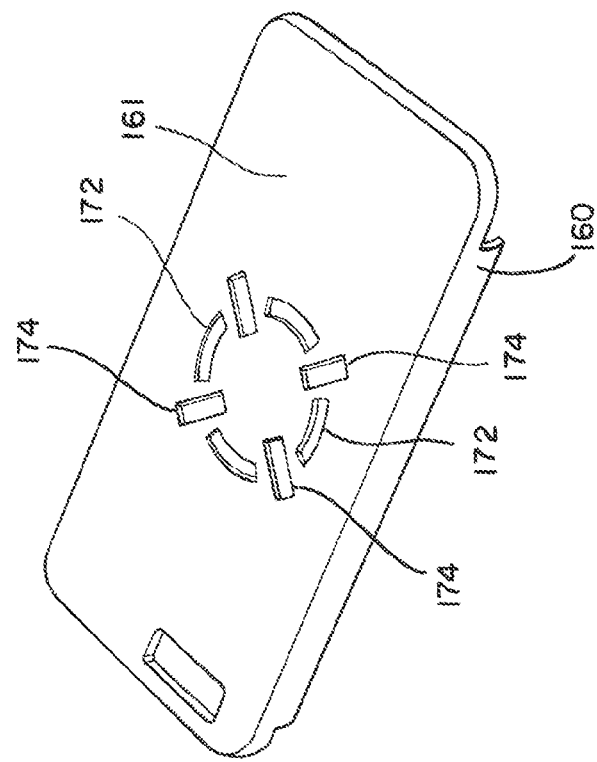
FIG. 8 is a view of the underside of the case assembly.

As shown in FIG. 8, the outer surface 161 of the case has a plurality of recesses 174 and 172 for registering with the base mount when the case assembly is coupled to the mount base. The recesses 172 run along a circle forming arcs on the case 160. Recesses 174 extend radially away from the center 157 of the case 160.

Figure 11:
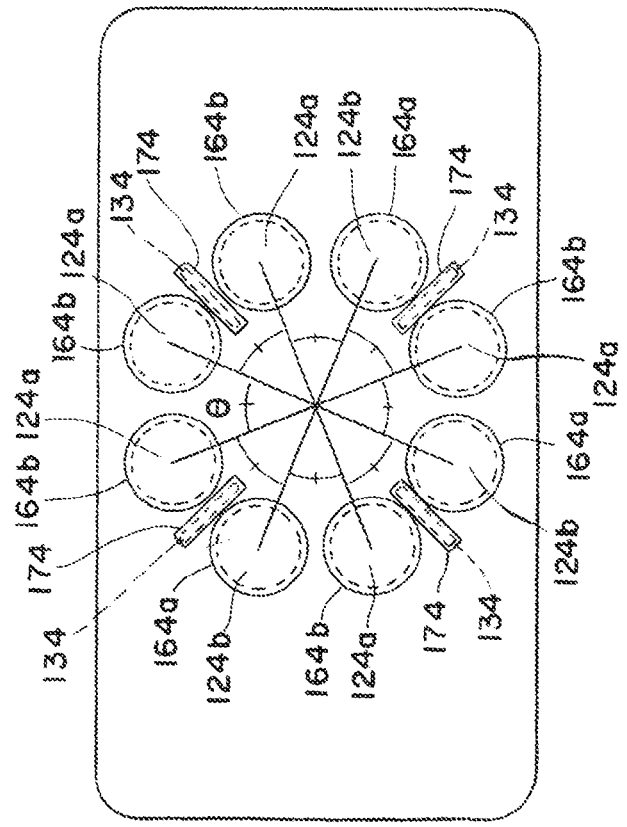
FIG. 11 is a schematic representation of the alignment of the magnets in the case and mounting assemblies where the case assembly is rotated ninety degrees.
Figure 10:
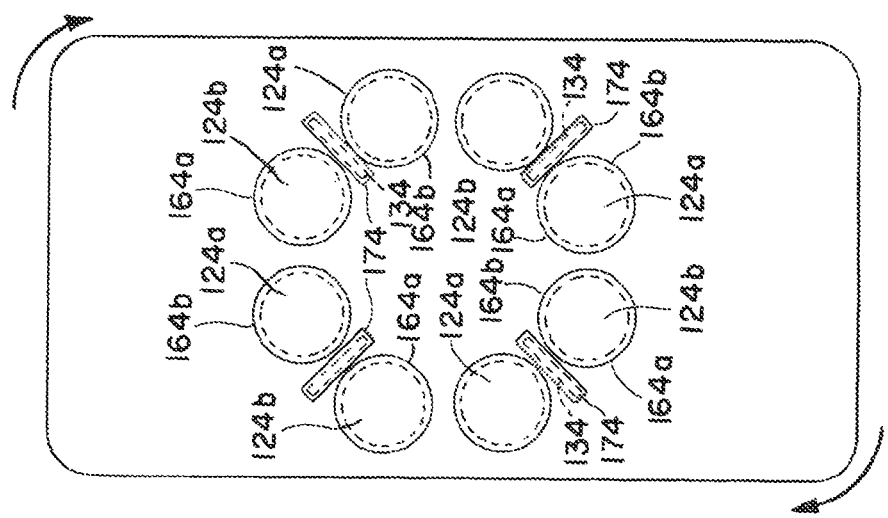
FIG. 10 is a schematic representation of the alignment of the magnets in the case and mounting assemblies.

FIGS. 10 and 11 are schematic representations of the alignment of the magnets in the case and mounting assemblies. The case assembly 150 mates with the mounting assembly 110 as a result of the magnetic attraction between the base magnets 124a and 124b and the case magnets 164a and 164b. When the top surfaces of the base magnets 124a/124b have opposite magnetic polarity of the bottom surface of the adjacent case magnets 164a/164b, the case assembly 150 is magnetically coupled to the base mount 110.

In one or more embodiments, the polarity of the magnets 124a is opposite that of magnets 164b, and the polarity of 124b is opposite that of case magnets 164a. As opposing poles attract, the case assembly 150 will magnetically couple to the mounting assembly 110.

FIG. 10 also depicts the alignment and registration of the recesses 174 of the case assembly 150 receiving the protrusions 134 of the base assembly 110. The recesses 172 of the case assembly 150 also receive the protrusions 132 of the base assembly 110. The recesses receiving the corresponding protrusions serve to accurately align the case assembly 150 with respect to the mounting assembly 110, as well as to provide lateral support for the case assembly 150.

As shown schematically, a user may rotate the case assembly 150 relative to the base assembly 110. The rotation will misalign the case magnets 164a/164b from their attractive coupling to the base magnets 124a/124b shown in FIG. 10, and position case magnets 164a/164b above base magnets 124a/124b having the same magnetic polarities. Rotating the case assembly 150 relative to the mounting assembly 110 will cause the case assembly 150 to magnetically attach and detach at fixed angles.

FIG. 11 is a schematic representation of the alignment of the magnets in the case assembly 150 and the mounting assembly 110 where the case assembly 150 is rotated ninety degrees. Similarly, the case assembly 150 mates with the mounting assembly 110 rotated ninety degrees clockwise as a result of the magnetic attraction between the base magnets 124a and 124b and the case magnets 164a and 164b. When the top surfaces of the base magnets 124a/124b have opposite magnetic polarity of the bottom surface of the adjacent case magnets 164a/164b, the case assembly 150 is magnetically coupled to the base mount 110. In one or more embodiments, the polarity of the magnets 124a is opposite that of magnets 164b, and the polarity of 124b is opposite that of case magnets 164a. As opposing poles attract, the case assembly 150 will magnetically couple to the mounting assembly 110.

FIG. 11 also depicts that each case magnet 164a/164b is positioned angularly equidistant from the immediately adjacent case magnet 164b/164a and each base magnet 124a/124b is positioned angularly equidistant from the immediately adjacent base magnet 124b/124a by an angle $\theta$. For eight equally spaced recesses, the angle $\theta$ is 45 degrees. As the case assembly 150 is rotated about the mounting assembly, the case assembly 150 will attach to the mounting assembly at 0, 90, 180, and 270 degrees, and will detach at 45, 135, 225, and 315 degrees.

Figure 13:
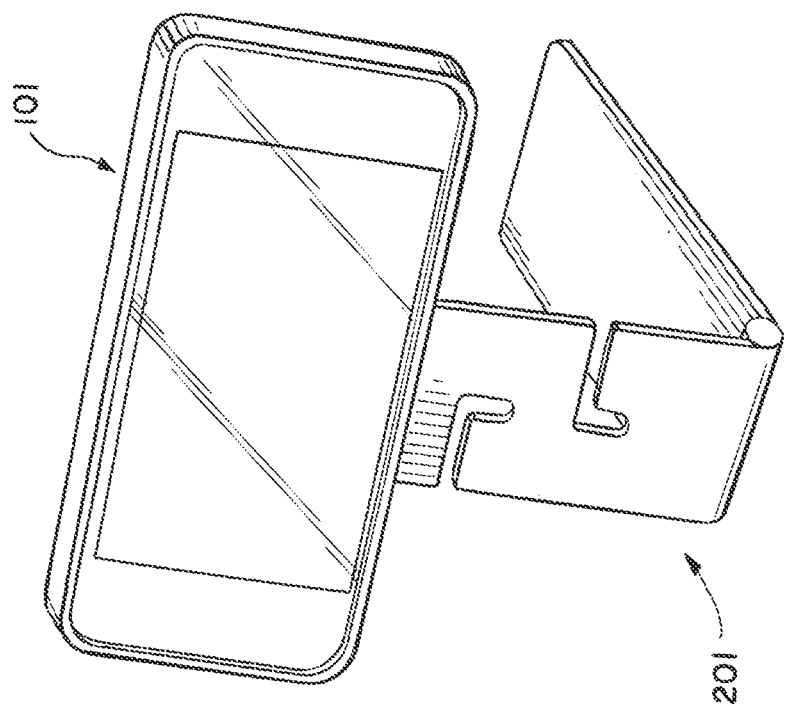
FIG. 13 is a side, perspective view of the mobile device holder with a smart phone affixed to the foldable table stand.
Figure 12:
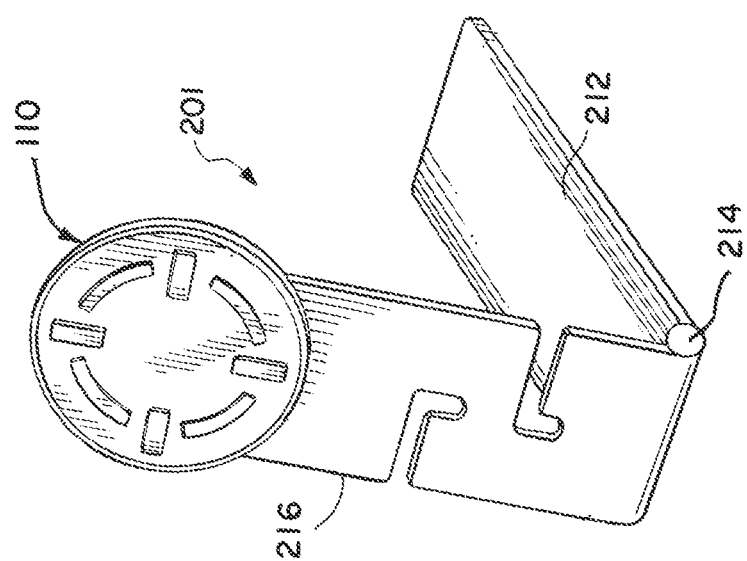
FIG. 12 is a side, perspective view of the mounting assembly coupled to a foldable table stand.
Figure 17:
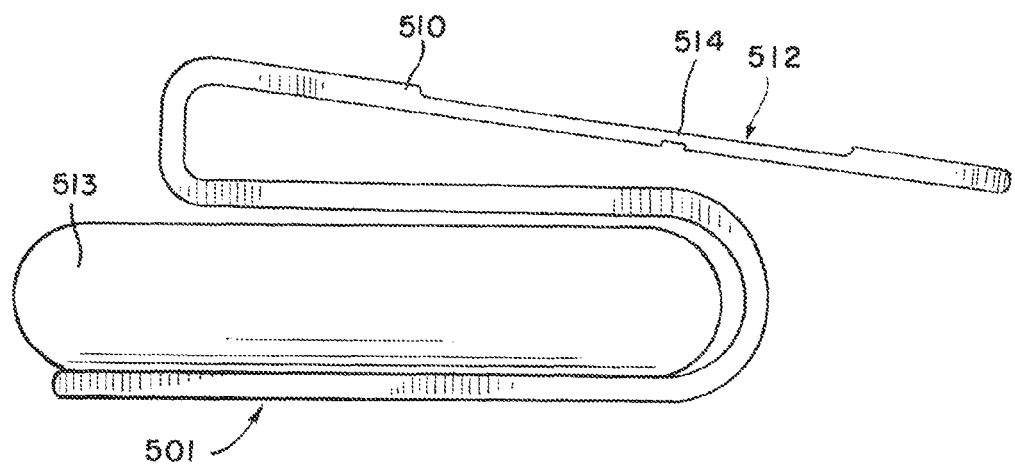
FIG. 17 is a side view of an automobile visor clip for affixing to an automobile visor.

FIGS. 12-31 illustrate several examples for attaching the mobile device holder 101 to various objects. FIG. 12 is a side, perspective view of the mounting assembly 110 coupled to a foldable table stand 201. The table stand has a base 212 coupled to a vertical plate 216 with a hinge 214. The mounting assembly 110 may be attached to the table stand 201 via a screw through a hole on the vertical plate secured to a threaded hole 126 as shown in FIG. 5. FIG. 13 is a side, perspective view of the mobile device holder 101 affixed to the foldable table stand 201. Consumers may use the table stand 201 while viewing pictures or video, or while engaging in video telephone calls for example.

FIGS. 14-16 are views of a vent mount 301 for affixing to an automobile vent louver 410. The vent mount 301 has protruding fingers 310 which may snap on to vent louvers of an automobile. FIG. 16 is a front, perspective view 401 showing the mobile device attached to the automobile vent 410 from the perspective of the driver. Consumers may use the vent mount 301 while navigating through traffic using GPS for example.

FIGS. 17-20 illustrate an automobile visor clip holder 501 for attaching the mobile device holder 101 an automobile visor. The visor clip may have a recessed portion 512 shaped to receive the mounting assembly, and well as a thru-hole 514 for receiving a screw 516 that would couple to a threaded hole 126 on the mounting assembly. The visor clip 501 may attach to a visor 520 or another thin supporting member 513. FIG. 20 is a front view illustrating a mobile device 101 affixed to an automobile visor 520 from the perspective of a driver.

FIGS. 21-24 illustrate a universal mount 601 for attaching the mobile device holder 101 to a cylindrically shaped bar.

FIG. 21 is a side view of a mounting assembly 110 affixed to a universal mount 601. The universal mount 601 may have a flat section 610 for coupling to the mounting assembly 110, as well as a strap 612 which wraps around other objects and is held in place with a locking mechanism 614. FIGS. 22-23 are views of a mobile device holder 101 affixed to a baby stroller 630. FIG. 24 shows a mobile device holder 101 attached to a post of an automobile headrest. The universal mount 601 provides a convenient means for attaching a smart phone to objects having exposed bars or rails.

FIG. 25a is a side, perspective view of a mount assembly 110 attaching to an adhesive backing 147 having a top adhesive surface 149a and a bottom adhesive surface 149b. The mount assembly 110 may comprise a stamped ferrous sheet metal with a peel off adhesive backing 149 for walls, desks, and anything one desires to which to mount a smart phone. FIG. 25b is a view of a mounting assembly 110 in a wallet 701 secured to a wallet fold 710.

Figure 26:
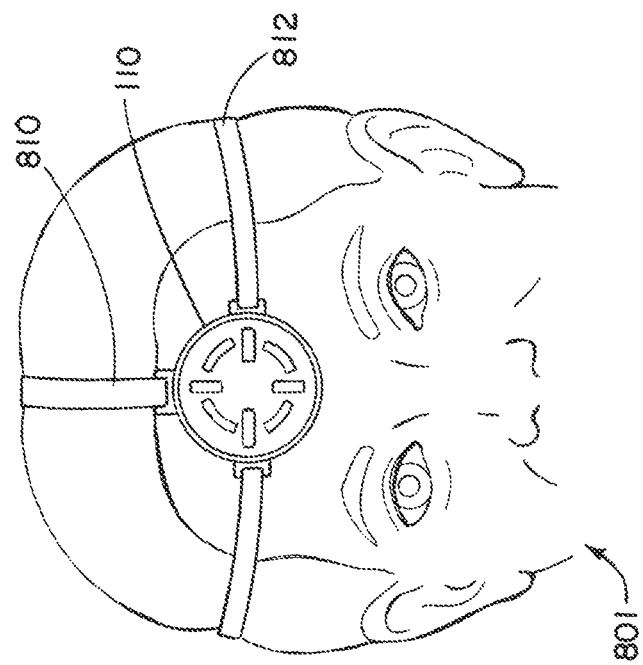
FIG. 26 is front, perspective view of a mounting assembly affixed to a head mount.
Figure 27:
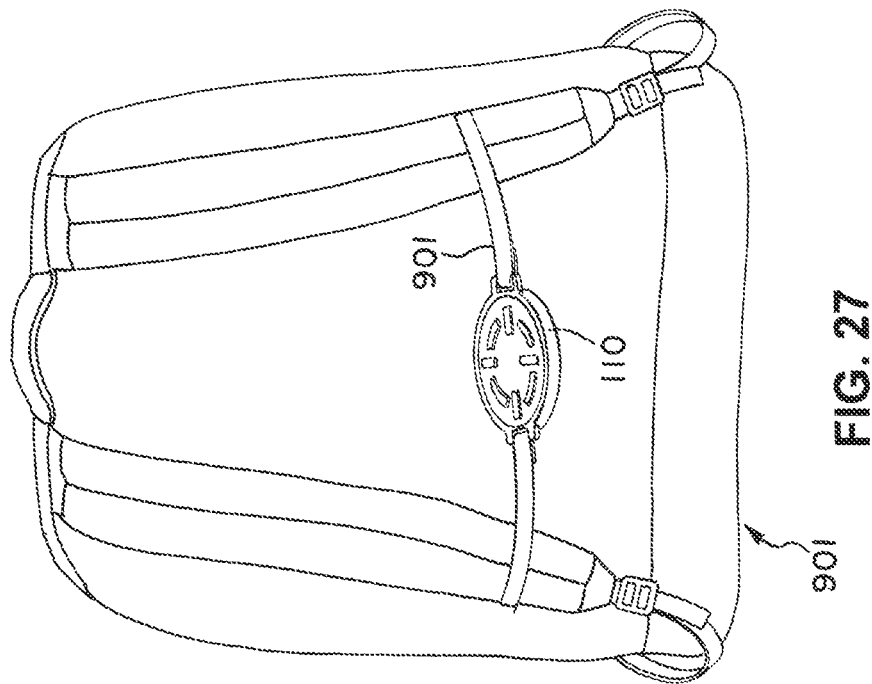
FIG. 27 is a mounting assembly affixed to a backpack.

FIGS. 26-27 illustrate the mobile device holder 101 attached to personal objects. FIG. 26 is front, perspective view of a mounting assembly 110 affixed to a head mount 801 having straps 810 and 812. FIG. 27 is a view of a mounting assembly affixed to a backpack 901 via straps 901.

Figure 29:
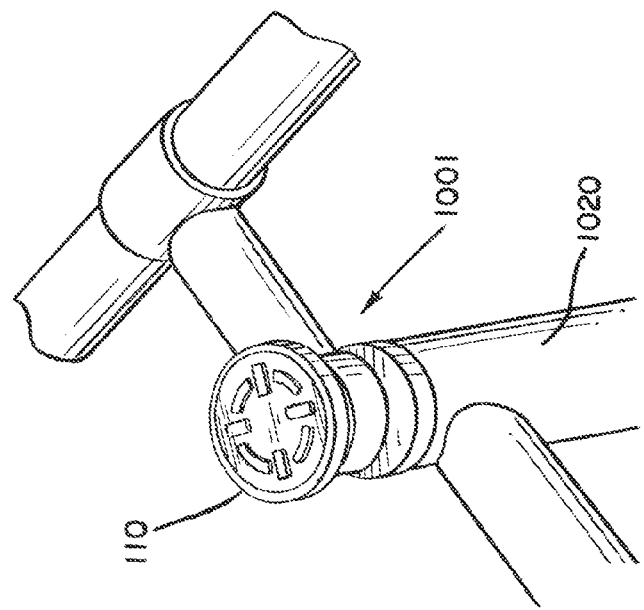
FIG. 29 is an illustration of a bicycle mount attached to a bicycle.
Figure 28:
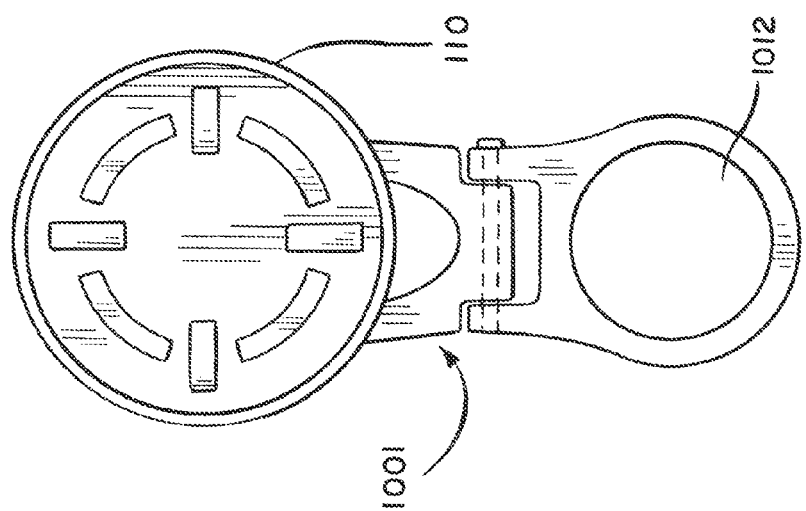
FIG. 28 is a mounting assembly coupled to a bicycle mount.

FIGS. 28-29 illustrate the mounting assembly 110 attached to a bicycle 1020. FIG. 28 is a bicycle mount 1001 coupled to a mounting assembly 110, the bicycle mount having a first section 1012 having a hole, and a second section coupled to the first section via a hinge 1010.

Figure 30:
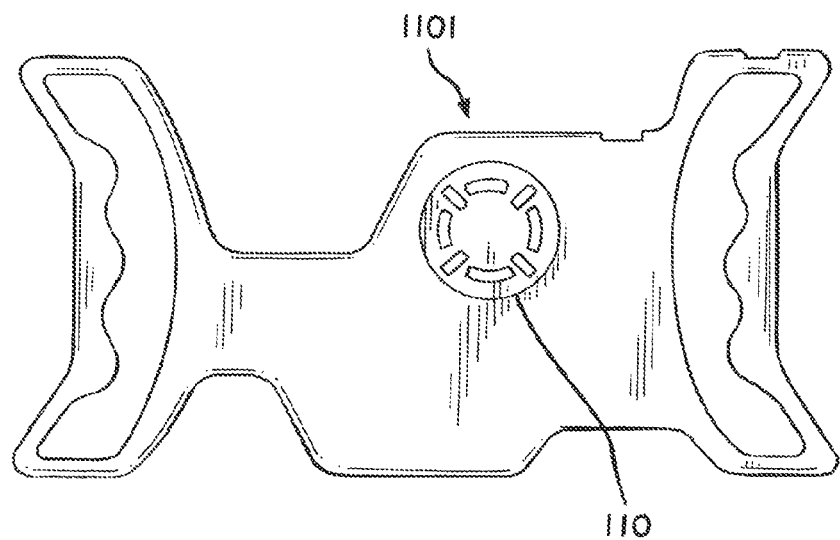
FIG. 30 is a front, perspective view of a mounting assembly attached to a flying squirrel mount.
Figure 31:
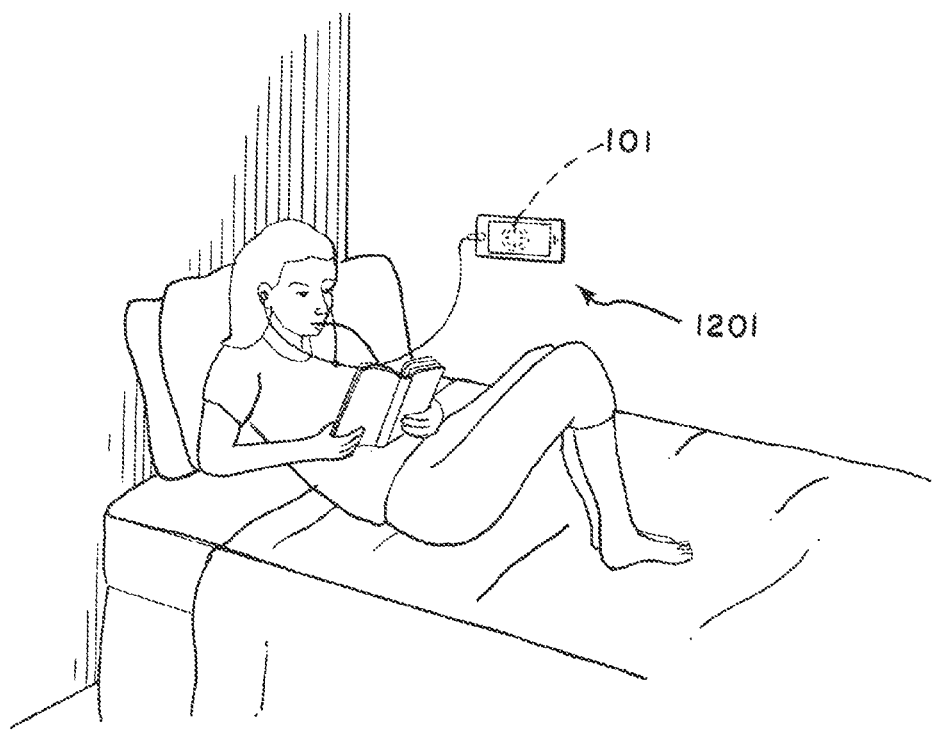
FIG. 31 is an illustration of a wall mounted mobile device.

FIG. 30 is a front, perspective view of a mount assembly 110 attached to a flying squirrel mount 1101. FIG. 31 is an illustration of a wall mount 1201 for securing a mobile device holder 101. The wall mount 1201 allows users to view videos or listen to music, for example. The wall mount 1201 may use an adhesive backing 147 as illustrated in FIG. 25a.

Figure 18:
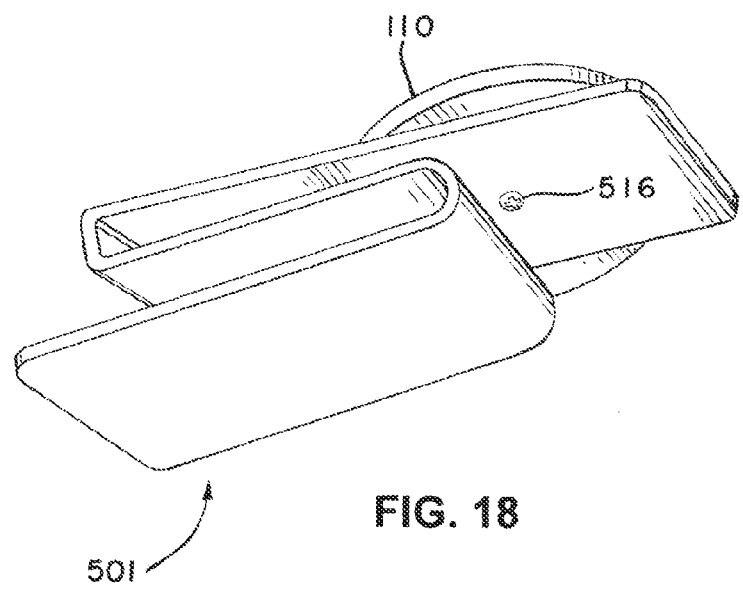
FIG. 18 is a perspective view of the visor clip having a mounting assembly.
Figure 32:
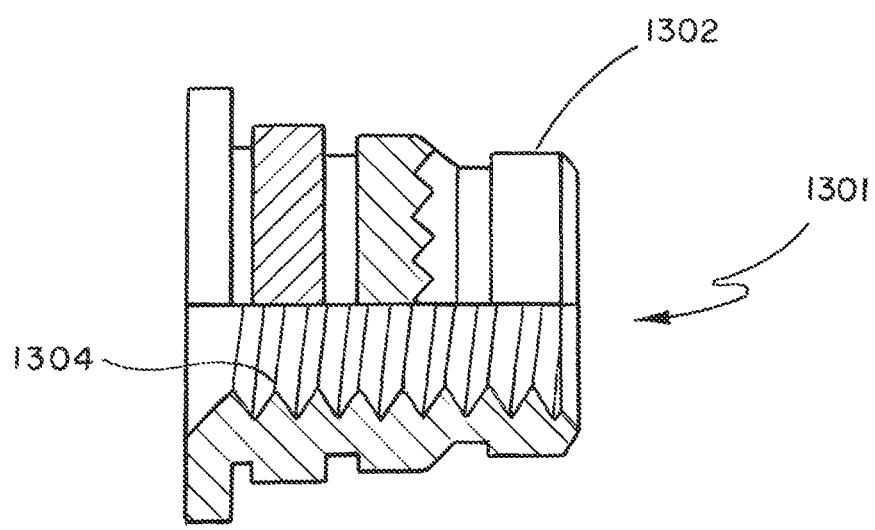
FIG. 32 is a cross-sectional view of a zert head which may be press fit into the case assembly.
Figure 33:
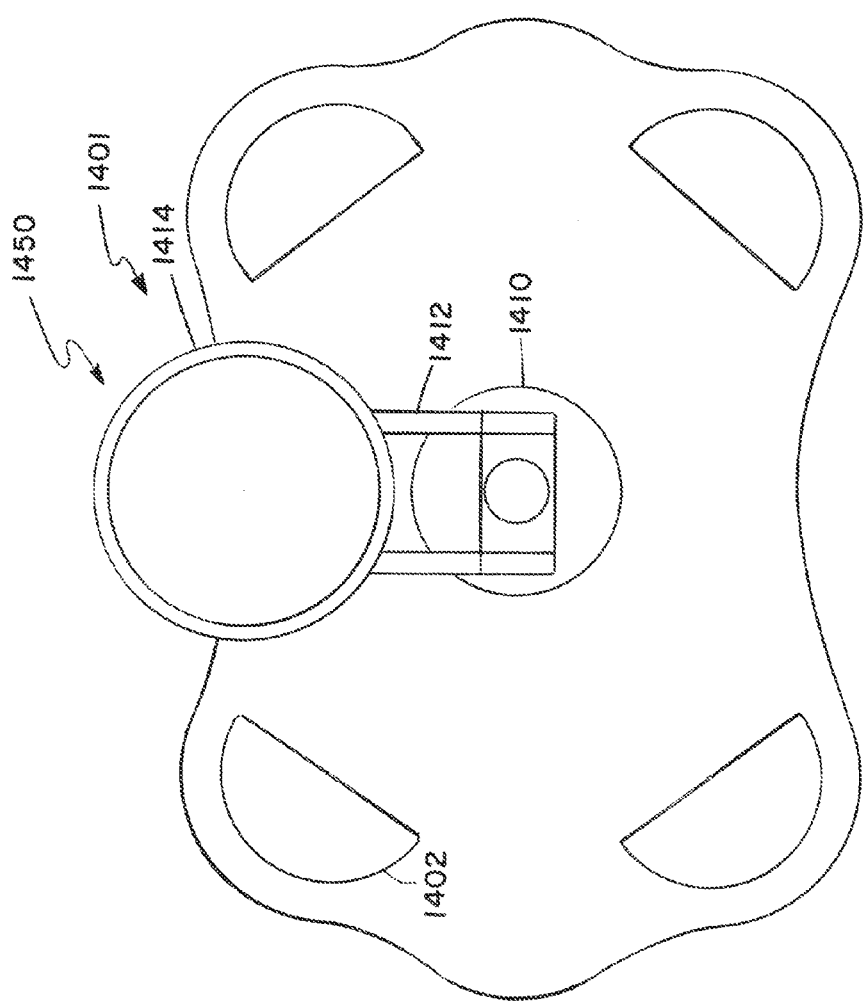
FIG. 33 is a front view of a chest harness having a hinged assembly.

FIG. 32 is a cross-sectional view of a zert nut 1301 which may be press fit into the case assembly. The zert nut 1301 has a plurality of exterior ridges 1302 for securing into an external hole. The zert nut 1301 also has a threaded, inner surface 1304 for receive screws or other threaded components. The zert nut 1301 may be employed in the mounting assembly depicted in FIG. 5, the visor clip having a mounting assembly as depicted in FIG. 18, the universal mount depicted in FIG. 21, and the squirrel mount depicted in FIG. 30.

Figure 37:
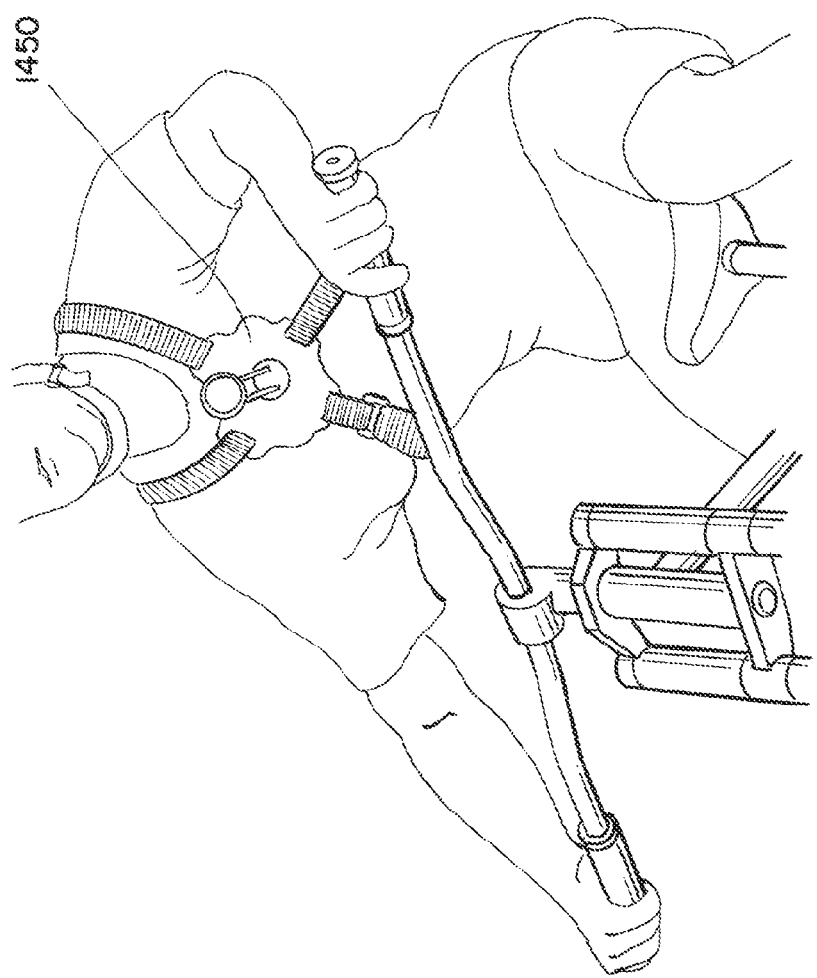
FIG. 37 is a side, perspective view of the chest harness strapped to a user.

FIGS. 33-37 illustrate a chest harness 1401 having a hinged assembly 1450 mounted on the region 1410 on the chest harness 1401. The hinged assembly 1450 has a base 1416 attached to arms 1412 via the hinge 1418. The arms 1412 are connected to a mounting surface 1414. A thumb screw 1420 is employed to secure the arms 1412 to the base 1416 at a desired angle as illustrated in FIG. 36. In one or more embodiments, the base 1416 may be coupled to a zert nut 1301. FIG. 37 is a side, perspective view of the chest harness 1401 strapped to a user.

Figure 38:
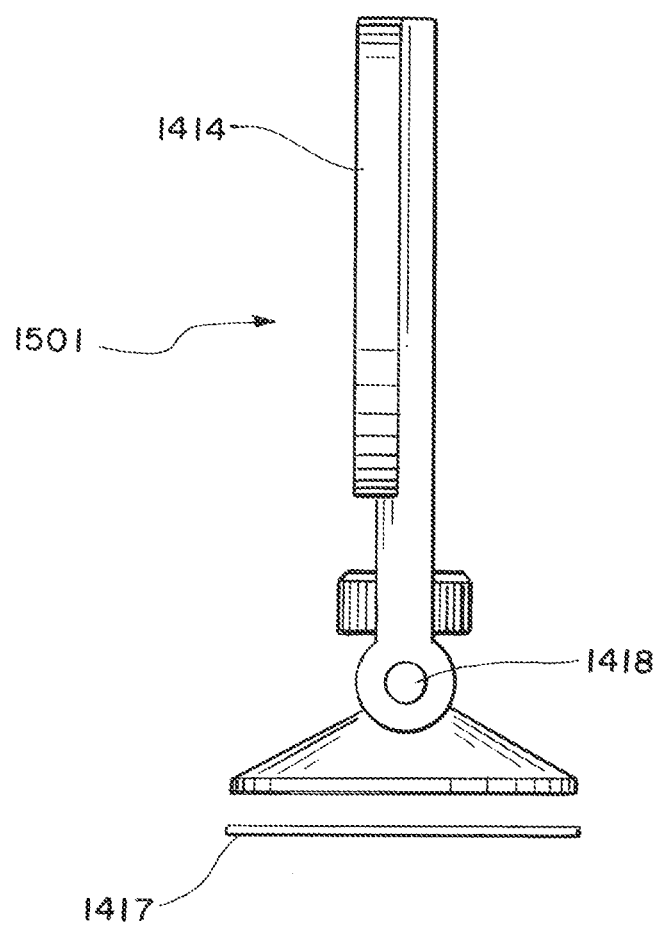
FIG. 38 is a side view of hinged assembly with an adhesive backing.
Figure 39:
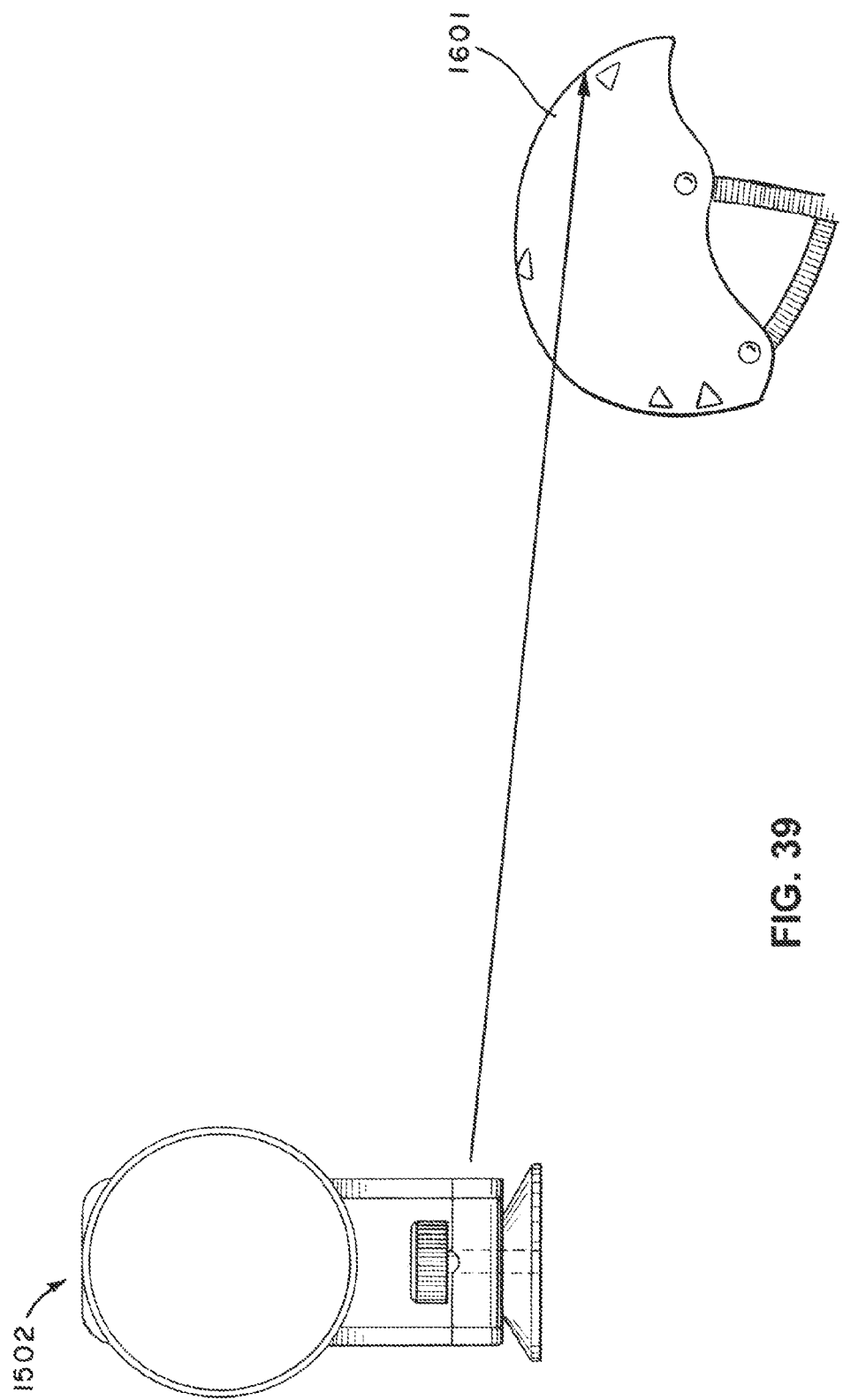
FIG. 39 is a representation of the hinged assembly attaching to a helmet.
Figure 40:
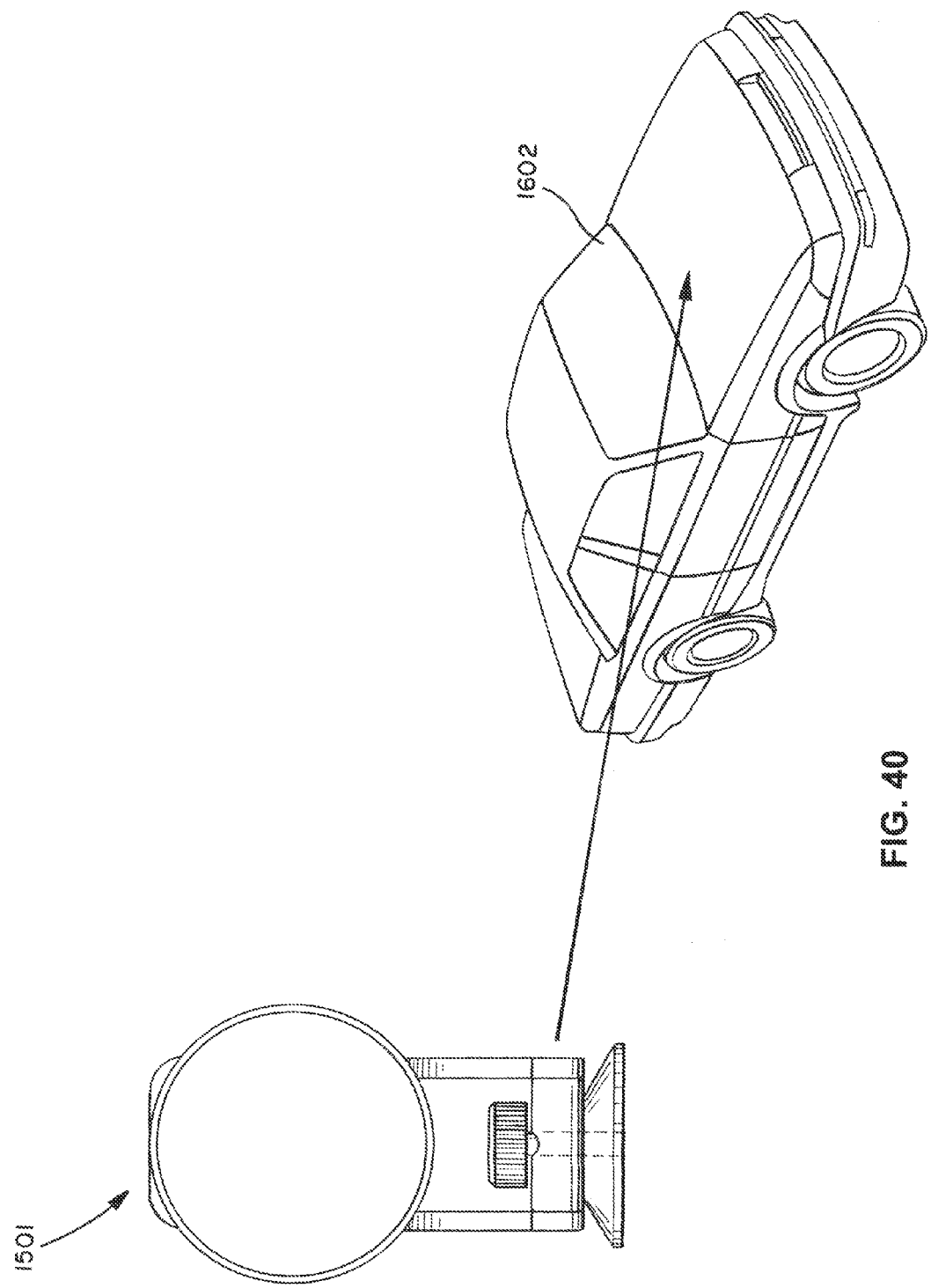
FIG. 40 is a representation of the hinged assembly attached to an automobile.

FIG. 38 is a side view of hinged assembly 1501 with an adhesive backing 1417. The hinged assembly may be placed on flat surfaces such as on a helmet shown 1601 in FIG. 39, or on an automobile 1602 as shown in FIG. 40.

Although embodiments referenced herein generally describe a multi-piece case assembly 150 and mounting assembly 150 each having recesses 122 and 162 for holding case and base magnets 164/124, other configurations are contemplated in one or more embodiments. In one or more embodiments, a case assembly is configured to receive a mobile electronic device, where a plurality of case magnets are coupled to the case assembly. Each of the case magnets are spaced apart equally circumferentially and spaced apart radially by a fixed radius from a first center. The mobile device holder further comprises a generally flat mounting base, and a plurality of base magnets coupled to the generally flat mounting base, each of the base magnets spaced apart equally circumferentially and spaced apart radially by the fixed radius from a second center. The case assembly magnetically couples to the mounting base when the case assembly is placed on top of the mounting base.

Although the invention has been discussed with reference to specific embodiments, it is apparent and should be understood that the concept can be otherwise embodied to achieve the advantages discussed. The preferred embodiments above have been described primarily as mobile device holders for attaching mobile devices such as smart phones to other objects. In this regard, the foregoing description of the mobile device holders is presented for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A mobile device holder, comprising:
   a case assembly comprising:
      a case defining a cavity, the cavity having a generally flat inner surface and an outer surface opposite the inner surface, the cavity configured to receive a mobile electronic device;
      a plurality of case magnets placed on the generally flat inner surface, each of the case magnets spaced apart equally circumferentially and spaced apart radially by a fixed radius from a first center; and
   a mounting assembly comprising:
      a generally flat mounting base;
      a plurality of base magnets placed on the generally flat mounting base, each of the base magnets spaced apart equally circumferentially and spaced apart radially by the fixed radius from a second center; and
      a mount cap positioned above and coupled to the mounting base, the mount cap surrounding the base magnets;
   wherein the case assembly magnetically couples to the mounting assembly when the outer surface of the case is placed on the mount cap,
   wherein the outer surface of the case further comprises a plurality of first registration members,
   wherein the mount cap further comprises a top surface, the top surface further comprises a plurality of second registration members;
   wherein the first registration members of the case engages with the second registration members of the base during the coupling process,
   wherein the first registration members comprise a plurality of rectangular shaped registration recesses positioned radially away from the first center,
   wherein the second registration members comprise a plurality of rectangular shaped registration protrusions positioned radially away from the second center, and
   wherein the first registration recesses receives the first registration protrusions during the coupling process.

2. The mobile device holder of claim 1, wherein:
the case magnets are arranged with alternating polarity orientation where each of the case magnets has a different magnetic polarity orientation from that of the immediately adjacent case magnets;
the base magnets are arranged with alternating polarity orientation such that each of the base magnets has a different magnetic polarity orientation from that of the immediately adjacent base magnets;
the case assembly magnetically couples to the mounting assembly when the first center is aligned with the second center and each case magnet is magnetically coupled to a corresponding base magnet.

3. The mobile device holder of claim 2, wherein:
each case magnet is positioned angularly equidistant from the immediately adjacent case magnet; and,
each base magnet is positioned angularly equidistant from the immediately adjacent base magnet.

4. The mobile device holder of claim 2, wherein the case assembly rotates about the mounting assembly and detachably couples with the mounting assembly at one or more fixed angles.

5. The mobile device holder of claim 2, further comprising a fixed or foldable hinged stand coupled to the mounting assembly.

6. The mobile device holder of claim 2, further comprising an automobile vent mount device coupled to the mounting assembly.

7. The mobile device holder of claim 2, further comprising an automobile visor clip coupled to the mounting assembly.

8. The mobile device holder of claim 2, further comprising a mount coupled to the mounting assembly, the mount having one or more straps which are configured to detachably couple to another object.

9. The mobile device holder of claim 2, where the defined flat mounting base can be fixedly secured to a flat surface via mechanical fastener, adhesives, or elastomeric attachment.

10. The mobile device holder of claim 2, where the defined flat mounting base can be worn by the user by means of a harness, headband, arm band, or belt clip.

11. The mobile device holder of claim 2, where the defined flat mounting base can be detachably secured to or integrated with a handheld pole, where the described base is pivotally attached to a fixed or extendable pole.

12. The mobile device holder of claim 2, where the defined flat mounting base can be detachably secured to or integrated with a threaded tri-pod mount.

13. The mobile device holder of claim 2, where the defined flat mounting base can be fixedly integrated into a wallet, by various means of attachment.

14. A mobile device holder, comprising:
a case assembly configured to receive a mobile electronic device;
a plurality of case magnets coupled to the case assembly, each of the case magnets spaced apart equally circumferentially and spaced apart radially by a fixed radius from a first center;
a generally flat mounting base; and,
a plurality of base magnets coupled to the generally flat mounting base, each of the base magnets spaced apart equally circumferentially and spaced apart radially by the fixed radius from a second center;
wherein the case assembly magnetically couples to the mounting assembly when the outer surface of the case assembly is placed on the mounting base,
wherein the outer surface of the case further comprises a plurality of first registration members,
wherein the mount cap further comprises a top surface, the top surface further comprises a plurality of second registration members, and
wherein the first registration members of the case engages with the second registration members of the base during the coupling process.

15. The mobile device holder of claim 14, wherein:
the first registration members comprise a plurality of first rectangular shaped registration recesses positioned radially away from the first center;
the second registration members comprise a plurality of first rectangular shaped registration protrusions positioned radially away from the second center;
the first registration recesses receives the first registration protrusions during the coupling process.

16. The mobile device holder of claim 15, wherein:
the case magnets are arranged with alternating polarity orientation where each of the case magnets has a different magnetic polarity orientation from that of the immediately adjacent case magnets;
the base magnets are arranged with alternating polarity orientation such that each of the base magnets has a different magnetic polarity orientation from that of the immediately adjacent base magnets;
the case assembly magnetically couples to the mounting assembly when the first center is aligned with the second center and each case magnet is magnetically coupled to a corresponding base magnet.

17. The mobile device holder of claim 16, wherein:
each case magnet is positioned angularly equidistant from the immediately adjacent case magnet; and
each base magnet is positioned angularly equidistant from the immediately adjacent base magnet.

18. The mobile device holder of claim 16, wherein the described mounting base a separate component can be detachably or fixedly attached to another stationary or mobile mounting surface by means of mechanical fastener, elastomeric attachment, adhesive attachment, or integrated attachment feature.

19. A mobile device holder, comprising
a case assembly comprising:
a case defining a cavity, the cavity having a generally flat inner surface and an outer surface opposite the inner surface, the cavity configured to receive a mobile electronic device, the generally flat surface having eight case recesses spaced apart equally circumferentially and spaced apart radially by a fixed radius from a first center the outer surface of the case further comprises a plurality of first registration members;
eight case magnets, each case magnet positioned within the corresponding case recess, the case magnets arranged with alternating polarity orientation where each of the case magnets has a different magnetic polarity orientation from that of the immediately adjacent case magnets;
a mounting assembly comprising:
a generally flat mounting base having eight base protrusions radially spaced apart by a fixed radius from a second center, each of the base magnets spaced apart equally circumferentially and spaced apart radially by the fixed radius from a second center;
a mount cap positioned above and coupled to the mounting base, the mount cap surrounding the base magnets, the top base surface of the mount cap further comprises a plurality of second registration members;
wherein the case assembly magnetically couples to the mounting assembly when the outer surface of the case is placed on the mount cap, wherein the first registration members of the case engages with the second registration members of the base top cap during the coupling process.

20. The mobile device holder of claim 19, further comprising eight base magnets, each base magnet positioned within the corresponding base recess, the base magnets arranged with alternating polarity orientation such that each of the base magnets has a different magnetic polarity orientation from that of the immediately adjacent base magnets.

21. The mobile device holder of claim 19, further comprising a fixed or foldable hinged stand coupled to the mounting assembly.

22. The mobile device holder of claim 19, further comprising an automobile vent mount device coupled to the mounting assembly.

23. The mobile device holder of claim 19, further comprising an automobile visor clip coupled to the mounting assembly.

24. The mobile device holder of claim 19, further comprising a mount coupled to the mounting assembly, the mount having one or more straps which are configured to detachably couple to another object.

25. A mobile device holder, comprising:
a case assembly configured to receive a mobile electronic device;
a case magnet coupled to the case assembly;
a generally flat mounting base; and,
a base magnet coupled to the generally flat mounting base,
wherein the case assembly magnetically couples to the mounting assembly when the outer surface of the case assembly is placed on the mounting base,
wherein the outer surface of the case further comprises a singular first registration member or a plurality of first registration members,
wherein the mount cap further comprises a top surface, the top surface further comprises a second registration member or a plurality of second registration members;
wherein the first registration member or members of the case engages with the second registration member or members of the base during the coupling process,
wherein the first registration member or members include a rectangular shaped registration recess,
wherein the second registration member or members include a rectangular shaped registration protrusion, and
wherein the first registration recess or recesses receives the second registration protrusion or protrusions during the coupling process.

26. The mobile device holder of claim 25, wherein the described mounting base, as a separate component, can be detachably or fixedly attached to another stationary or mobile mounting surface by means of mechanical fastener, elastomeric attachment, adhesive attachment, or integrated attachment feature.

27. The mobile device holder of claim 26, where the defined flat mounting base as a separate component can be fixedly secured to a flat surface via mechanical fastener, adhesives, or elastomeric attachment.

28. The mobile device holder of claim 26, where the defined flat mounting base as a separate component can be worn by the user by means of a harness, headband, arm band, or belt clip.

29. The mobile device holder of claim 26, where the defined flat mounting base as a separate component can be detachably secured to or integrated with a handheld pole, where the described base is pivotally attached to a fixed or extendable pole.

30. The mobile device holder of claim 26, where the defined flat mounting base as a separate component can be detachably secured to or integrated with a threaded tri-pod mount.

31. The mobile device holder of claim 26, where the defined flat mounting base as a separate component can be fixedly integrated into a wallet, by various means of attachment.

* * * * *